Patented Mar. 6, 1934

1,949,825

UNITED STATES PATENT OFFICE 1,949,825

PROCESS FOR THE PRODUCTION OF CARBOXYLIC ACIDS

Gilbert B. Carpenter, Bellemoor, Del., assignor to E. I. du Pont de Nemours & Company, Wilmington, Del., a corporation of Delaware No Drawing. Application August 24, 1931, Serial No. 559,129

4 Claims. (Cl. 260—114)

This invention relates to a process for the preparation of formic acid from carbon monoxide and steam and is directed particularly to the use of a new catalyst for the reaction.

It has been known that carbon monoxide and steam will react, in the presence of a suitable catalyst, to give formic acid. As this process is one which employs raw materials that are relatively inexpensive, it should, under favorable conditions, produce the acid at an exceptionally low cost. Its commercial success, however, will in no small part be determined by the catalyst used. Those which have been proposed heretofore have not been entirely satisfactory for commercial operation due to low yield, short life, and other economic considerations. Efforts of investigators in this art have been directed, therefore, to the discovery of catalysts having high activity and which, furthermore, favor the production of formic acid while tending to inhibit the formation of undesirable side products.

An object of the present invention is to provide new catalysts for the preparation of formic acid from carbon monoxide and steam having the above desirable characteristics. Other objects will hereinafter appear.

According to the present invention formic acid can be prepared from carbon monoxide and steam by passing a mixture of these gases over a catalyst which comprises a compound containing at least two substantially non-volatile acidic elements. The elements which are particularly well adapted for the formation of such compounds include the acidic elements of groups III, IV, V, and VI of the periodic table, such, for example, as tungsten, molybdenum, uranium, chromium, arsenic, phosphorus, vanadium, boron, titanium, and zirconium. Typical compounds formed from two of the above non-volatile acidic elements are phospho-molybdic acid, phospho-tungstic acid, phospho-silicic acid, chromium vanadate, vanadium molybdate, silico-tungstic, silico-molybdic acids, etc. Mixtures of these complex compounds as catalysts for the reaction may likewise be used. The catalysts may be supported or not, as desired, although generally I prefer to support them on the usual types of catalyst supports such, for example, as fuller's earth, kieselguhr, and particularly on activated charcoal which per se will catalyze the reaction.

The carbon monoxide required for this synthesis may conveniently be derived from various commercial sources, such as, for example, water-gas, producer gas, etc., by liquefaction or other methods, and should likewise for the best results be relatively pure.

Inert gases, such as nitrogen, carbon dioxide, etc. may be included with the reactants, this being advantageous in some cases from the standpoint of controlling the temperature of the exothermic reaction and of limiting the extent thereof, or it may be desired to restrict the overall conversion of the reaction for the sake of enhancing the relative yield of formic acid.

I prefer generally to conduct the reaction at pressures in excess of atmospheric, say from 25–900 atmospheres. The reaction proceeds over a wide range of temperatures employing the above described catalysts, depending upon the gaseous composition employed. Generally the desired conversion of the carbon monoxide and steam to formic acid can be obtained at a temperature of from 100–400° C. although I generally prefer to conduct the reaction in the range of from 200–300° C.

The following examples will illustrate one method of practising the invention, although the invention is not limited thereto.

Example 1.—A gaseous mixture consisting of 90 parts by volume of carbon monoxide, and 20 parts by volume of steam was passed at a pressure of 700 atmospheres and a temperature of 325° C. over a silico-tungstic acid catalyst. This catalyst was prepared by mixing a solution of sodium silicate with a solution of sodium tungstate containing an equivalent amount of sodium tungstate. The resulting solution was acidified with hydrochloric acid and extracted with ether. The ether was evaporated from the extract and the residue taken up with water, the aqueous solution of the residue being used to impregnate silica gel. This catalyst was disposed in a suitable type of reaction chamber for conducting exothermic gaseous reactions. Upon condensation of the reaction product, a condensate containing a high percentage of formic acid was obtained.

Example 2.—A gaseous mixture comprising 95 parts by volume of carbon monoxide and 20 parts by volume of steam was passed over a silico-molybdic acid catalyst. The pressure during the reaction is maintained at approximately 200 atmospheres and the temperature at approximately 325° C. A good yield of formic acid admixed with other aliphatic carboxylic acids will be obtained.

The apparatus which may be employed for conducting the reaction may be of any conventional type and preferably one in which the temperature of exothermic reactions can be readily controlled at the desired temperature. Owing to the corrosive action of formic acid, the interior of the converter and conduits therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese, or nickel.

Various changes may be made in the method of employing the above catalysts for the preparation of formic acid from carbon monoxide and steam without departing from this invention or sacrificing the advantages that may be derived therefrom.

I claim:

1. In a process for the preparation of formic acid from a gaseous mixture of carbon monoxide and steam the step which comprises passing the gaseous mixture over an acid containing at least two chemically combined substantially non-volatile acid-forming elements as a catalyst for the reaction.

2. In a process for the preparation of formic acid from a gaseous mixture of carbon monoxide and steam the step which comprises passing the gaseous mixture over an acid containing at least two chemically combined substantially non-volatile acid-forming elements selected from the group consisting of the acidic elements of groups III, IV, V, and VI of the periodic table as a catalyst for the reaction.

3. In a process for the preparation of formic acid from a gaseous mixture of carbon monoxide and steam the step which comprises passing the gaseous mixture over a silico-tungstic acid catalyst.

4. In a process for the preparation of formic acid from a gaseous mixture of carbon monoxide and steam the step which comprises passing the gaseous mixture over a phosphomolybdic acid catalyst.

GILBERT B. CARPENTER.